United States Patent [19]

Kitagishi

[11] Patent Number: 4,955,715
[45] Date of Patent: Sep. 11, 1990

[54] PSUEDO FORMAT CAMERA
[75] Inventor: Nozomu Kitagishi, Hachioji, Japan
[73] Assignee: Canon Kabushiki Kaisha, Tokyo, Japan
[21] Appl. No.: 429,559
[22] Filed: Oct. 31, 1989
[30] Foreign Application Priority Data Oct. 31, 1988 [JP] Japan ................. 63-276876
Oct. 31, 1988 [JP] Japan ................. 63-267877

[51] Int. Cl.⁵ .................. G03B 19/12; G03B 13/10
[52] U.S. Cl. ........................ 354/155; 354/106; 354/195.12; 354/222; 354/224
[58] Field of Search ............ 354/152, 153, 154, 155, 354/156, 158, 195.12, 199, 200, 201, 219, 221, 222, 223, 224, 225, 105, 106

[56] References Cited

U.S. PATENT DOCUMENTS

| | | | |
|---|---|---|---|
| 3,490,844 | 1/1970 | Sapp | 354/105 X |
| 3,958,257 | 5/1976 | Johnson | 354/155 X |
| 4,104,663 | 8/1978 | Yamazaki et al. | 354/195.12 |
| 4,652,104 | 3/1987 | Harvey | 354/222 X |
| 4,862,202 | 8/1989 | Tsuboi et al. | 354/152 X |

FOREIGN PATENT DOCUMENTS

| | | |
|---|---|---|
| 0847990 | 9/1960 | United Kingdom . |
| 1393377 | 5/1975 | United Kingdom . |
| 2001768 | 2/1979 | United Kingdom . |
| 1558832 | 1/1980 | United Kingdom . |

Primary Examiner—A. A. Mathews
Attorney, Agent, or Firm—Fitzpatrick, Cella, Harper & Scinto

[57] ABSTRACT

A single-lens reflex camera capable of switching of the optical path of a light beam from an objective lens between one leading to a photographing surface and one leading to viewfinder is disclosed, in which an auxiliary lens for contracting an image on objective lens is inserted to be on the image side thereof when switching a mode for exposing the photographing surface over to a mode, in which light is led to the viewfinder, and the viewfinder magnification is increased with a shift of some lenses of the viewfinder when a mode for printing with pseudo telephoto function is selected.

14 Claims, 11 Drawing Sheets

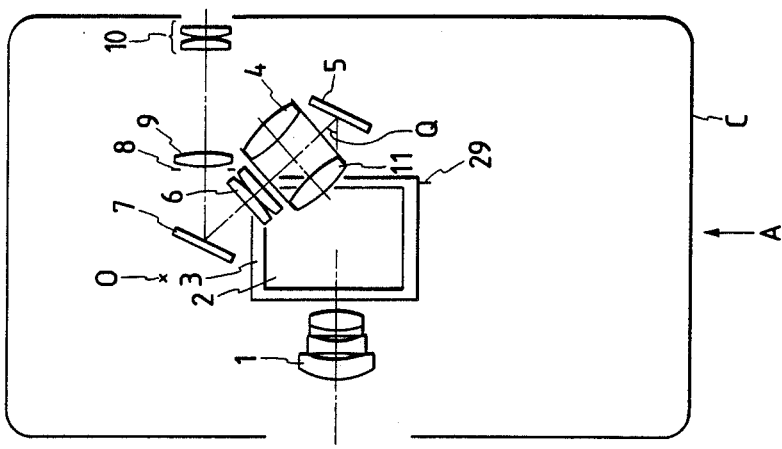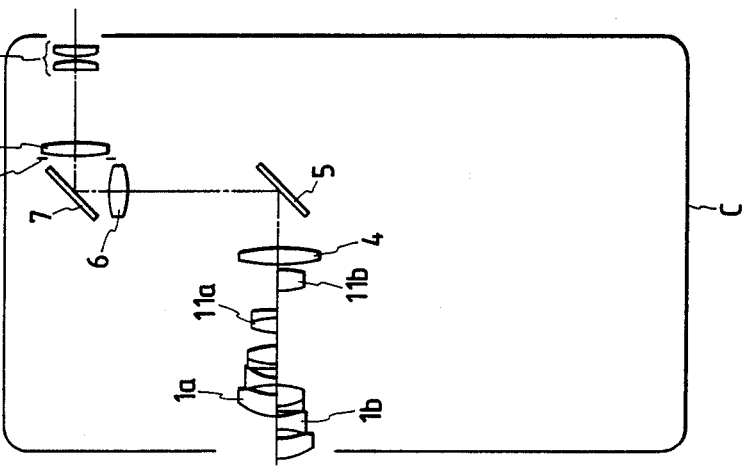

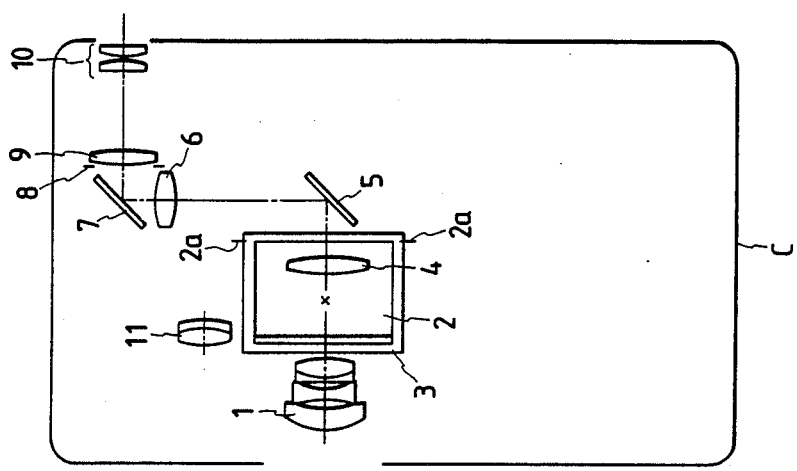
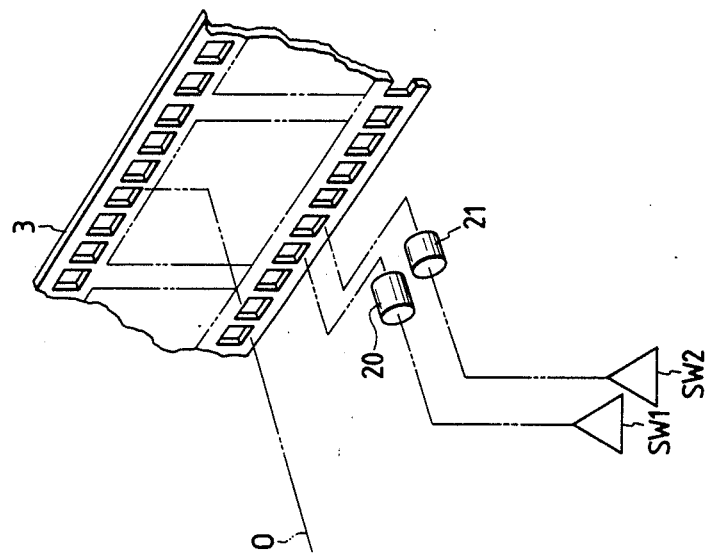

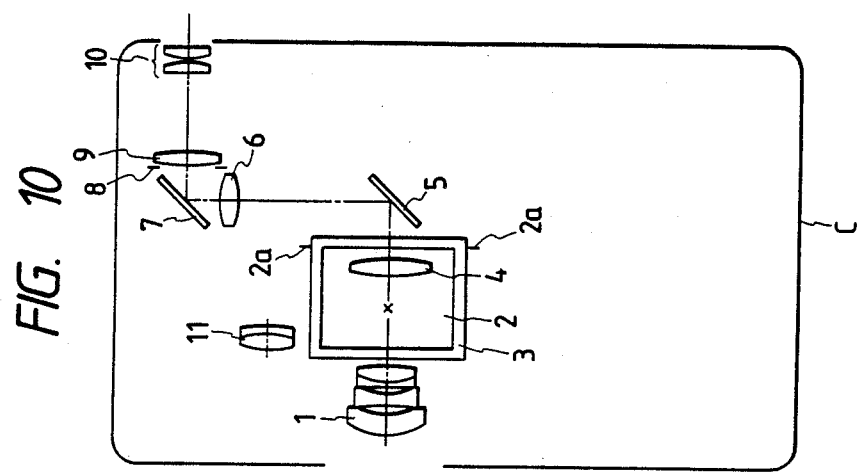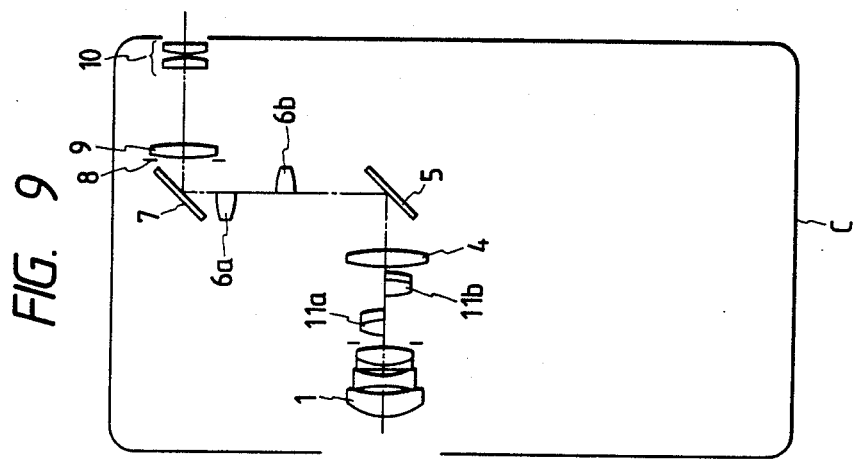

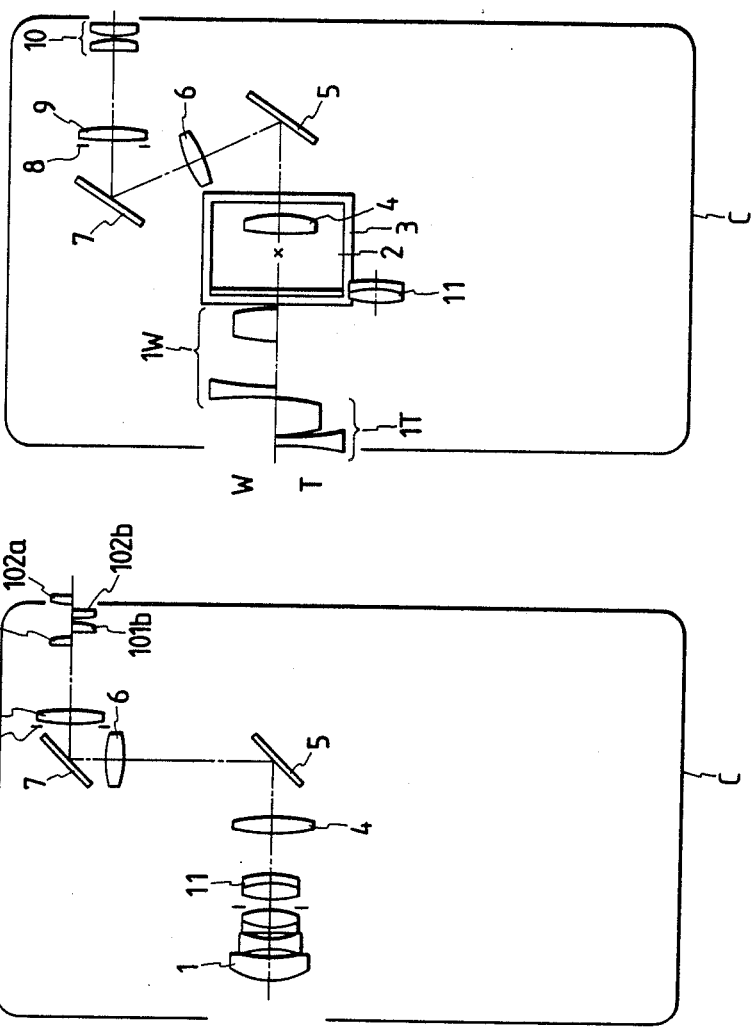

PSUEDO FORMAT CAMERA

BACKGROUND OF THE INVENTION

1. Field of the Invention

This invention relates to a single-lens reflex camera having a psuedo telephoto function and, more particularly, to a single-lens reflex camera, in which an auxiliary lens is inserted to receive a light beam from an objective lens for magnifying the viewfinder image in a viewfinder observation mode.

2. Related Background Art

Techniques concerning a commonly termed psuedo telephoto effect, in which a photograph such as those obtainable by using a photographing lens of telephoto type can be obtained by using a standard photographing lens by printing not the entire frame but only a portion thereof of film on a printing sheet, are recently proposed and disclosed in, for instance, U.S. Pat. Nos. 3,490,844 and 4,652,104.

In U.S. Pat. No. 3,490,844, there is proposed a technique for varying the size of field frame in such a psuedo telephoto mode to permit confirmation by the user of the field to be trimmed.

In U.S. Pat. No. 4,652,104, there is proposed technique for varying the field magnification of an external viewfinder without varying the magnification of the photographing lens in a psuedo telephoto mode.

Further, Japanese Patent Publication Sho No. 60-57577 discloses a camera, which permits switching of the photographed image size between full and half sizes. In this technique, when the image size is switched from the full size over to the half size, the same effect as obtainable by enlarged-size printing can be obtained by printing on a printing sheet of the same size.

In the case of the U.S. Pat. No. 3,490,844 noted above, however, the telephoto effect is visually recognized without changing the viewfinder image size but by changing the field frame. Therefore, the field frame is small in size and inconvenient to observe.

In the case of U.S. Pat. No. 4,652,104, although the viewfinder magnification is varied, the viewfinder used in the device is an external viewfinder. Therefore, the interlock relation of the viewfinder to the photographing lens in case of varying the magnification is complicated. Besides, parallex, which is a problem peculiar to the external viewfinder is inevitable.

Japanese Utility Model Publication Sho No. 53-29143 further shows a technique pertaining to the present invention.

SUMMARY OF THE INVENTION

A primary object of the invention is to provide a single-lens reflex camera, which permits printing with a psuedo telephoto function.

Another object of the invention is to provide a single-lens reflex camera which can be small in size, particularly, one which permits size reduction of the viewfinder system while providing a magnifying function thereto.

According to the invention, there is provided a single-lens reflex camera capable of switching of the optical path of a light beam from an objective lens between one leading to a photographing surface and one leading to viewfinder, in which an auxiliary lens for contracting an image on the objective lens is inserted to be on the image side thereof when switching a mode for exposing the photographing surface over to a mode, in which light is led to the viewfinder, and the viewfinder magnification is increased with a shift of some lenses of the viewfinder when a mode for printing with psuedo telephoto function is selected.

BRIEF DESCRIPTION OF THE DRAWINGS

FIGS. 1 to 3 illustrate a first embodiment of the invention, in which:

FIG. 1 is a plan view;

FIG. 2 is a sectional view taken along line A—A in FIG. 1; and

FIG. 3 is a view showing lens positions in a normal viewfinder mode and in a psuedo telephoto mode;

FIGS. 4 to 6 illustrate a second embodiment of the invention, showing lens positions in a photography mode, in a normal viewfinder mode and in a psuedo telephoto mode, respectively;

FIG. 7 is a perspective view showing a film and a trimming signal recording section of a psuedo format camera;

FIGS. 8 and 9 illustrate a third embodiment of the invention, showing lens positions in a photography mode and in two viewfinder observation modes, respectively;

FIGS. 10 and 11 illustrate a fourth embodiment of the invention, showing lens positions in a photography mode and in two veiwfinder observation modes, respectively;

FIGS. 18 and 19 illustrate an eight embodiment of the invention, showing lens positions in a photography mode and in two viewfinder observation modes; and FIGS. 20 and 21 illustrate a ninth embodiment of the invention, showing lens position in a photography mode and in two viewfinder observation modes, respectively.

DETAILED DESCRIPTION OF THE INVENTION

Figure 2:
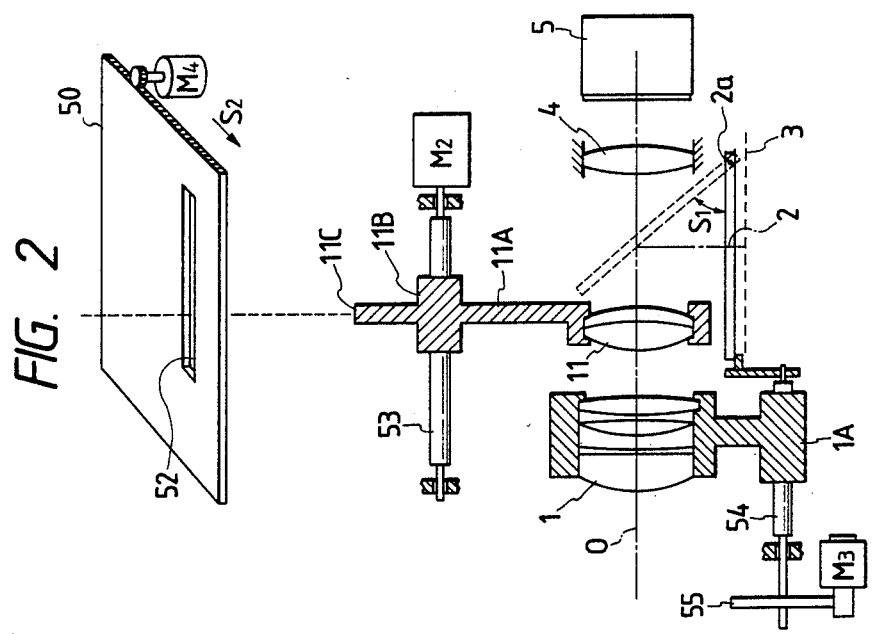
Figure 1:
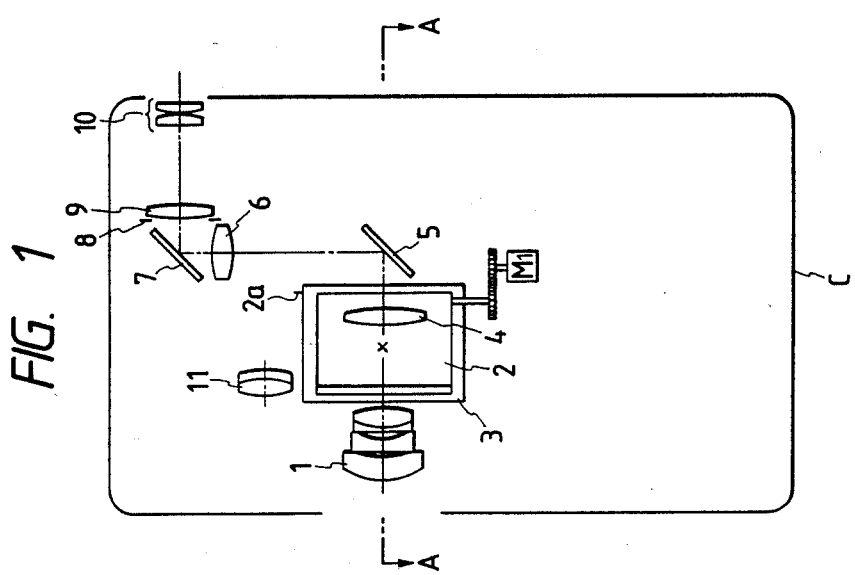
Figure 5:
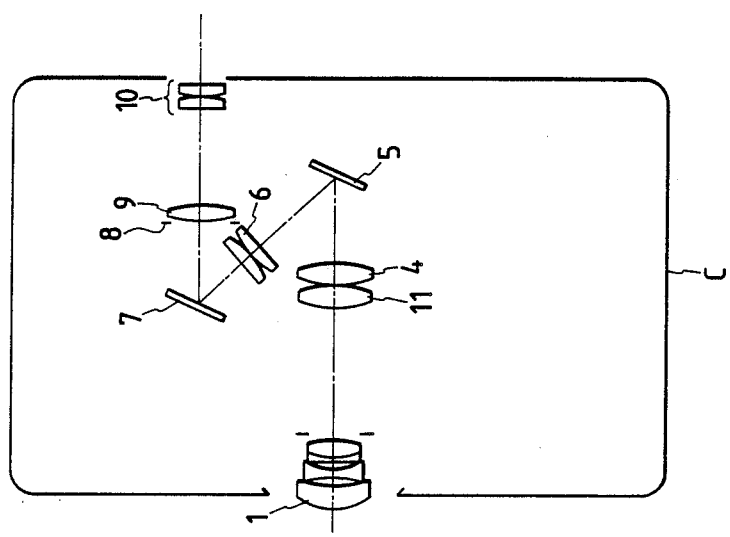

Now, an embodiment of the invention will be described with reference to the drawings. FIG. 1 is a plan view showing a single-lens reflex camera according to the invention to illustrate a function of the camera at the time of photographing, and FIG. 2 is a sectional view taken along line A—A in FIG. 5 showing an optical system and other main elements of the camera of FIG. 1 at a viewfinder observation mode. Referring to the Figures, designated at C is camera housing, 1 objective, and 2 mirror rotatable about shaft 2a by a drive force of motor M1. When rotary mirror 2 is tilted by 45 degrees with respect to optical axis 0, it reflects a light beam from objective lens 1 by 90 degrees to be parallel with the optical axis (i.e., parallel to the plane of paper) and led to film 3. Designated at 4 is a field lens disposed outside the trace of rotation of rotary mirror 2 and near a primary focusing plane of objective 1, 5 and 7 mirrors held an angle of 45 degrees with respect to the optical axis of objective 1, and 6 erect image lens interposed between mirrors 5 and 7. Designated at 8 is a field lens frame disposed near a secondary focusing plane of objective 1, 9 a field lens, and 10 an eyepiece. Designated at 11 is an auxiliary lens unit providing positive refraction. Unit 11 is held retreated out of the optical path as shown in FIG. 1 during photographing.

As shown in FIG. 1, when taking a picture, film 3 is exposed by light provided from objective 1 and reflected by mirror 2. At this time, the light image is reversed by mirror 2 and expose the film with a reversed image function. However, from this reversed image, a normal print can be arranged through a process at the time of subsequent fixing.

Now, the main system and operation of the camera when looking into the viewfinder will be described with reference to FIGS. 1 and 2.

Referring to FIG. 2, designated at 50 is a plate with slit 52 extending in the direction of the optical axis. In slit 52 is engaged projection 11c of auxiliary lens holder 11A for holding auxiliary lens 11. Plate 50 can be shifted in the direction of arrow S2 by motor M4, When the viewfinder system is formed after exposure of the film surface, rotary mirror 2 is turned down by shaft 2a and motor M1 to cover the film surface to prevent the film from being exposed. Subsequently, plate 50 is shifted by motor M4. Consequently, auxiliary lens 11 is shifted about shaft 53 to a position behind and aligned to objective 1. Thus, light from objective 1 is focused through auxiliary lens 11 to the neighborhood of field lens 4. Since auxiliary lens 11 provides positive refraction as noted before, a smaller image than the image formed on film surface 3 is formed in the neighborhood of field lens 4. This has an effect of permitting size reduction of the viewfinder behind and inclusive of field lens 4. The user can observe the image through mirror 5, erect image lens 6, mirror 7, field lens 9 and eyepiece.

Now, a case of switching the normal mode described above over to a pseudo telephone mode will be described.

Shafts 53 and 54 are formed with thread-like grooves and can be rotated by respective motors M2 and M3 to displace lens 1 or 11 along the optical axis. In this embodiment, when setting the pseudo telephoto mode, the viewfinder magnification is increased by causing displacement of objective lens 1 and auxiliary lens 11 to the object side and image surface side, respectively. The user, therefore, can visually recognize a telephoto effect when looking into the viewfinder.

Various numerical data of various lenses noted above are given below.

Numerical Data

| | Normal mode | | Pseudo telephoto mode |
|---|---|---|---|
| Objective lens 1 | f = 28.736 | Da = 9.254 | Db = 26.454 |
| Auxiliary lens 11 | f = 19.482 | Da = 9.741 | Db = 2.043 |
| Field lens 4 | f = 17.581 | Da = 30.588 | Db = 30.588 |
| Erect image lens 6 | f = 12.595 | Da = 21.412 | Db = 21.412 |
| Field lens 9 | f = 20.363 | Da = 16.5 | Db = 16.5 |
| Eyepiece lens 10 | f = 16.5 | | |

In this example of numerical data, the contraction factor of the auxiliary lens is 0.5, and the focusing magnification factor of the erect image lens is −0.7. It is more effective for reducing the viewfinder systems size and providing for a compact camera to permit contraction of the focusing magnification factor of erect image lens 6 for relaying onto the field lens frame. The contraction factor of auxiliary lens 11 is desirably in a range of 0.7 to 0.3. The upper limit of 0.7 is set so in view of the size of the viewfinder system. On the other hand, for reducing it to be higher than 0.3, the power of auxiliary lens 11 has to be increased, which makes it difficult to remove spherical aberration and astigmatism of the viewfinder system.

FIG. 3 shows lens arrangement in the normal viewfinder mode and pseudo telephoto mode. Lens positions designated at 1a and 11a are in the normal viewfinder mode, and those designated at 1b and 11b are in the pseudo telephoto mode.

While displacement of various lenses for setting a mode for leading light to the viewfinder from a photographing state (i.e., state in which the film surface is being exposed), when switching the state of leading light to the viewfinder over to the photographing state, auxiliary lens 11 is retreated out of the optical path of objective lens 1 by motor M4 and then the rotary mirror is restored by motor M1.

FIG. 7 is a fragmentary perspective view showing a recording section for recording a trimming signal in a pseudo format camera pertaining to the invention. Designated at 0 is the axis of the light beam from objective 1 after reflection substantially by right angles by rotary mirror 2. Film 3 is located on axis 0. Designated at 20 and 21 are light-emitting diodes for imprinting a trimming signal to be described later between adjacent perforations of film 3. Designated at SW1 and SW2 are switches for controlling the light emission state of light-emitting diodes 20 and 21. When photographing is performed in a normal state, switch SW1 is turned on, light-emitting diode 20 is turned on to effect imprinting of one dot image onto a predetermined position of film 3 between adjacent perforations thereof. When negative film obtained after development is set in a particular enlarger, the enlarger detects the dot image and recognizes that the photographing is effected in the standard mode of the pseudo format camera, and thus it enlarges the entire frame of image without trimming. When photographing is performed in the pseudo telephoto mode, both switches SW1 and SW2 become into on-state to turn on both light-emitting diodes 20 and 21. Thus, two dot images are imprinted at predetermined positions between adjacent perforations of film 3. After development, the enlarger detects the dot images and recognizes that photographing is effected in the telephoto mode of the pseudo format camera. Thus, in the photography in the pseudo telephoto mode a print of an intended magnification greater than that in case of the photography in the standard mode can be obtained.

When the invention is applied to a camera which is capable of switching of image size between full and half sizes, enlargement to the same print size is made according to the photographed image size without imprinting of any trimming signal. Thus, a greater enlargement is obtained in the half size, and thus a telephoto effect can be obtained.

Figure 6:
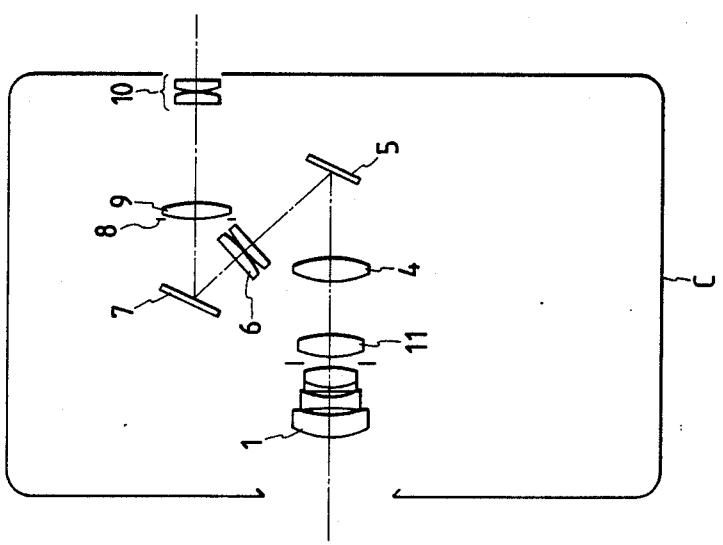

FIGS. 4 to 6 illustrate a second embodiment of the invention. FIG. 4 is a plan view showing the embodiment in a photographing mode, FIG. 5 is a plan view showing the same in a normal viewfinder observation mode, and FIG. 6 is a plan view showing the same in a pseudo telephoto mode of viewfinder observation. In FIGS. 4 to 6, parts like those in FIGS. 1 and 2 are designated by the same reference numerals and symbols, and they are not described any further. Referring to FIG. 4, pseudo lens 4 and auxiliary lens 11 are held in a cylinder. During photographing, they are held retreated to be on a photoelectric surface of the viewfinder. To form the viewfinder system, they are turned around point 0 on the left side and above mirror 3. More specifically, at the time of viewfinder observation as shown in FIGS. 5 and 6, the field lens 4 and auxiliary lens 11 are rotated in unison with each other in the clockwise direction around point 0 from the position shown in FIG. 4 to a position on and aligned to the optical axis between objective 1 and mirror 5. By permitting retreat of auxiliary lens 11 to the space in the viewfinder system in this way, the space factor can be improved, and a compact camera can be realized.

Further, for improving the space factor, mirror is adapted to reflex the viewfinder light beam not by right angles but by 47 degrees. Angle Q with respect to the optical axis is suitably selected between 35 degrees and 60 degrees. If it is smaller than 35 degrees, the overlap of optical path becomes excessive, and the erect image lens undesirably interferes with the light beam.

FIGS. 8 and 9 illustrate a third embodiment. FIG. 8 shows the embodiment in a photography mode, and FIG. 9 shows the same in a viewfinder observation mode. In this embodiment, in the normal viewfinder observation mode shown in FIG. 9, the auxiliary lens 11a and erect image lens 6a are held in the vicinity of objective 1 and mirror 7, respectively. In the pseudo telephoto mode, the auxiliary lens 11b and erect image lens 6b are shifted toward field lens 4 and mirror 5, respectively, to change the viewfinder magnification and enhance the telephoto effect. In this arrangement, objective 1 which is heaviest among the lenses is stationary, and it is necessary to shift only the auxiliary lens and erect image lens 6 which are light in weight. Thus, it is possible to reduce the lens drive force and shocks when lenses are moved.

Figure 11:
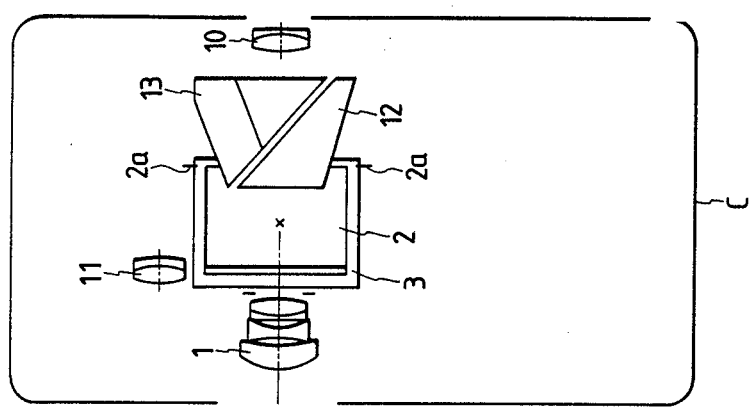

FIGS. 10 and 11 show a fourth embodiment of the invention. FIG. 10 shows the embodiment in a photography mode, and FIG. 11 shows the same in a viewfinder observation mode. Designated at 11a is an auxiliary lens, 8a field lens, and 10a eyepiece. In the pseudo telephoto mode shown in FIG. 11, the auxiliary lens 11b is shifted toward the field lens 4, while field lens frame 8b and eyepiece 10b having positive refracting force are shifted in the optical axis direction (i.e., to the right in FIG. 11) away from field lens 9 in order to increase the viewfinder magnification for varying the viewfinder magnification while maintaining a constant sight.

With this arrangement, like the third embodiment objective 1 which is heaviest is stationary, and it is necessary to cause shift of only auxiliary lens 11, field lens frame 8 and eyepiece 10, these lenses being light in weight. Thus, the lens drive force and shocks when lenses are shifted can be reduced. Further, since eyepiece 10 is on the outermost side of camera body c, the mechanism for causing shift of eyepiece 10 can be readily disposed in the camera body C with improved space factor.

Figure 12:
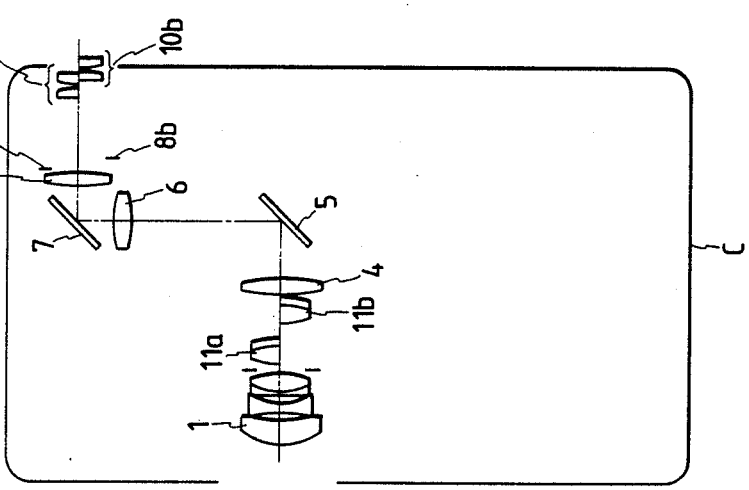
FIGS. 12 and 13 illustrate a fifth embodiment of the invention, showing lens positions in a photography mode and in two viewfinder observation modes, respectively.
Figure 13:
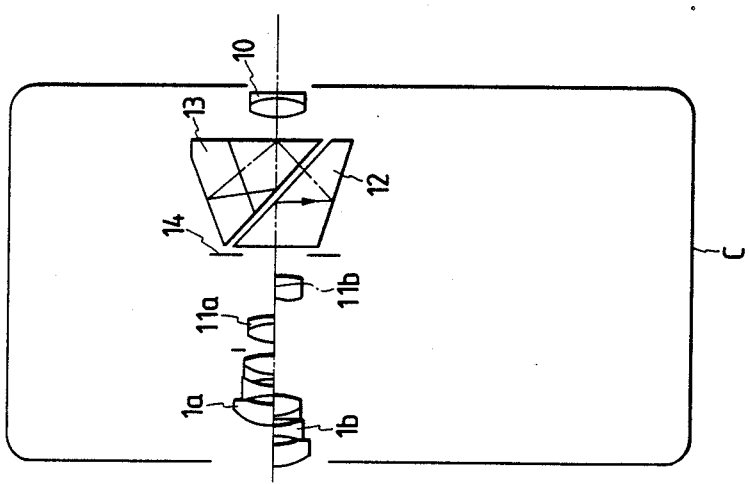

FIGS. 12 and 13 show a fifth embodiment of the invention. FIG. 12 shows the embodiment in a photography mode, and FIG. 13 shows the same in a viewfinder observation mode. In this embodiment, an erect image can be obtained with prisms 12 and 13 and without use of the erect lens and plurality of mirrors as noted before. Prisms 12 and 13 are disposed in a space behind mirror 2 to permit rotation of mirror 2 without being prevented by them. Designated at 14 are a field mask disposed on the front surface of prism 12. As shown in FIG. 13, objective 1a and auxiliary lens 11a which are found close to each other in the normal viewfinder observation mode, are shifted in the pseudo telephoto mode in a manner as described before in connection with FIGS. 1 and 2, that is, they are shifted in opposite directions along the optical axis.

Figure 14:
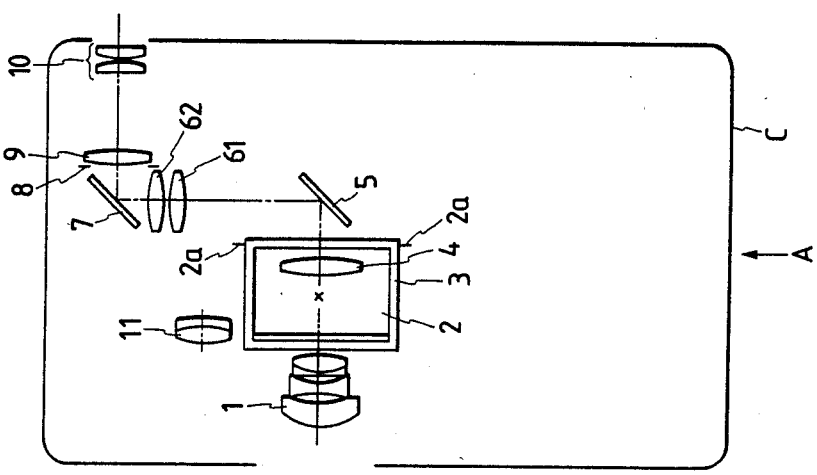
FIGS. 14 and 15 illustrate a sixth embodiment of the invention, in a photography mode and in two viewfinder observation modes, respectively.
Figure 15:
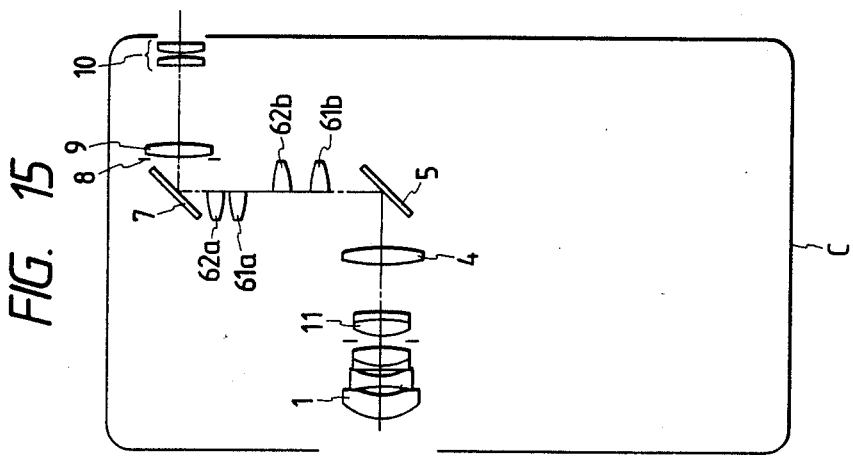

Now, a sixth embodiment of the invention will be described. FIGS. 14 and 15 are plan views showing a single-lens reflex camera embodying the invention. FIG. 14 shows the camera in a photography mode, and FIG. 15 shows the camera in a viewfinder observation mode. In this embodiment, erect image lens is constituted by at least two lenses 61 and 62.

In this embodiment, when forming the viewfinder system, auxiliary lens 11 having positive refractivity is inserted in a space, which is provided on the image side of objective 1 with rotation of the rotary mirror toward film surface 3. Thus, an image formed through auxiliary lens is smaller than the image formed on film surface 3. It is thus possible to reduce size of the viewfinder system.

When switching the normal viewfinder mode over to the pseudo telephoto mode, as shown in FIG. 15, erect image lenses 61b and 62b are shifted toward mirror 5 while varying the distance between them. The viewfinder magnification thus varied while maintaining a constant viewfinder sight. This means that a telephoto effect can be visually confirmed at the time of the viewfinder observation. In this embodiment, the focusing magnification of the erect image lens system is set to −0.5 in the normal mode of viewfinder observation and to −1.0 in the psuedo telephoto mode. Further, when this embodiment is applied to a camera for switching the photographed image size between full and half sizes, the focusing magnification of the erect image lens system may be set to −0.7 in the full size mode and −1.0 in the half size mode.

Figure 16:
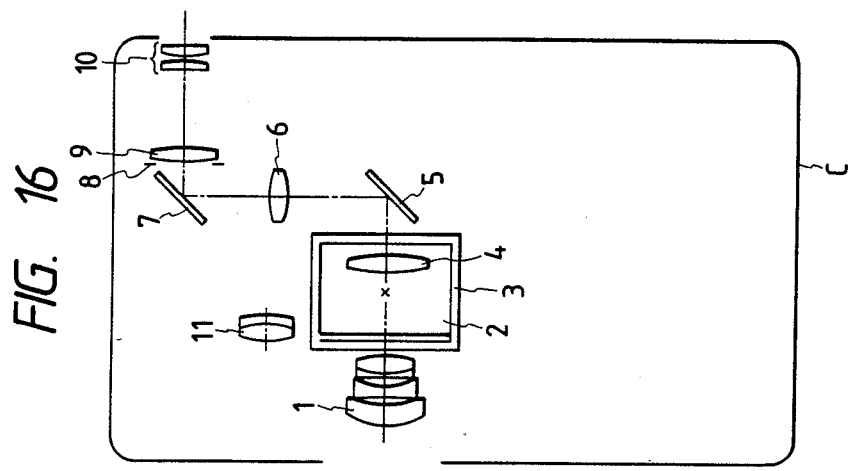
FIGS. 16 and 17 illustrate a seventh embodiment of the invention in a photography mode and in two viewfinder observation modes, respectively.
Figure 18:
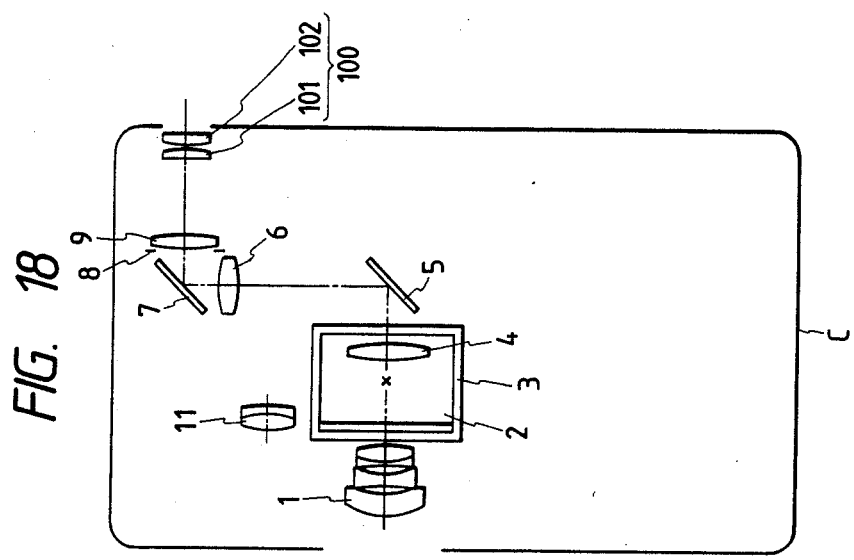
Figure 17:
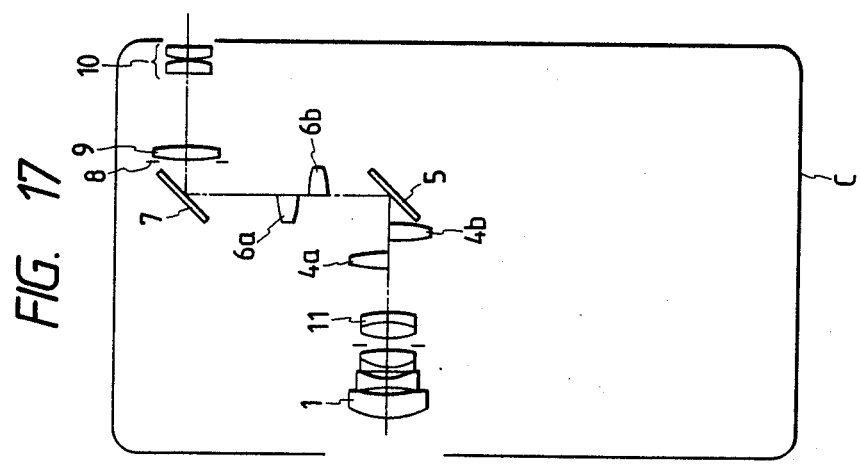

FIGS. 16 and 17 show a seventh embodiment of the invention. FIG. 16 shows the embodiment in a photography mode, and FIG. 18 shows the same in a viewfinder observation mode. In this embodiment, unlike the preceding sixth embodiments, only single erect image lens 6 is employed, while permitting shift of field lens 4 as well along the optical axis. Referring to FIG. 17, when setting the pseudo telephoto mode, the field lens 4 and erect image lens 6 shifted toward rotary mirror 5 from their positions 4a and 6a in the normal viewfinder observation mode to positions 4b and 6b. In this embodiment, both field lens 4 and erect image lens 6 are shifted along the optical axis for a magnification change. Thus, it is possible to set comparatively small extents of shift of the two and prevent interference of adjacent lenses on the optical path on each other in a case, for instance, where the viewfinder optical path is Z-like. It is thus possible to permit the viewfinder optical system to be accommodated compactly in the camera.

FIGS. 18 and 19 show an eighth embodiment of the invention. FIG. 18 shows the embodiment in a photography mode, and FIG. 19 shows the same in a viewfinder observation mode. In this embodiment, eyepiece 100 consists of at least two lenses 101 and 102 capable of being shifted in the direction of the optical axis. Referring to FIG. 19, the positions of two lenses 101 and 102 are designated by these numerals with suffix a in the normal viewfinder mode and with suffix b in the pseudo telephotomode. In this embodiment, both lenses 101 and 102 are erect image lenses, and the distance between the two lenses is reduced for enlargement. More specifically, two lenses 101 and 102 are shifted from positions 101a and 102a in the normal viewfinder mode along the optical axis toward each other to positions 101b and 102b in the pseudo telephoto mode, thus effecting a viewfinder magnification change while maintaining a constant sight. With this arrangement, it is necessary to shift only eyepiece 100 which is the lightest in weight. Thus, the lens drive force and shocks when lenses are shifted can be reduced. Further, since eyepiece 100 is disposed at an outermost position in the camera body C and is very small in size, the mechanism for shifting the eyepiece 100 can be readily disposed in the camera body C with the best space factor.

Figure 21:
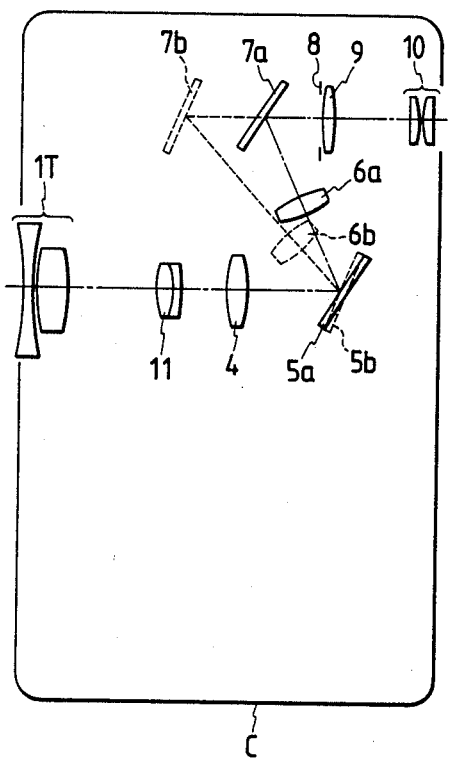

FIGS. 20 and 21 show nineth embodiment of the invention. FIG. 9 shows the embodiment in a photography mode, and FIG. 21 shows the same in a viewfinder observation mode. In this embodiment, the objective 1 has a structure consisting of two lens groups and serves as zoom lens with the two lens groups shifted in the direction of the optical axis while varying the distance between them at the time of zooming from wide side (1W) toward telephoto side (1T). In the photographing mode shown in FIG. 20, like other embodiments described above, auxiliary lens 11 is retreated from the optical path. In the normal viewfinder observation mode the auxiliary lens is first inserted. When switching the mode over to the pseudo telephoto mode, the optical path is changed by turning mirror 5, and also erect image lens 6 and mirror 7 are shifted along this new optical path. More specifically, the light beam having passed through field lens 4 is led through mirror 5a, erect image lens 6a and mirror 7a to eyepiece 10, whereas in the pseudo telephoto mode it is led through mirror 5b, erect image lens 6b and mirror 7b to eyepiece 10 to increase the viewfinder magnification. Further, at the time of switching to the pseudo telephoto mode, erect image lens 6 is shifted along the optical axis while changing the distance between the primary and secondary focusing planes, thus effecting a magnification change while maintaining a constant sight. With this arrangement, the structure of the erect image lens can be simplified compared to the case of the first embodiment, and also it is possible to reduce the deterioration of image performance.

While the above embodiments of the invention have concerned with pseudo format single-lens reflex camera, the invention is also applicable to a camera which is capable of switching of photographed image size between full and half sizes.

The invention is further applicable to a camera incapable of switching of photographed image size. In this case, the viewfinder is utilized for permitting accurate focusing, for observation of image partly enlarged in size or for obtaining a telescopic effect.

Further, the position of the field lens frame shown in each of the above embodiments is by no means limitative; for instance, a field lens frame may be provided on the primary focusing plane, or a focusing plate may be provided on the optical path.

What is claimed is:

1. A single-lens reflex camera comprising:
    objective lens means;
    viewfinder means including a plurality of lenses;
    switching means for switching the optical path of a light beam from said objective lens means between one leading to a focusing plane and one leading to said viewfinder means;
    auxiliary lens means inserted to be on the image side of said objective lens means in an interlocked relation to the switching of said switching means; and
    switching means for shifting said objective lens means and at least one of said auxiliary lens means and said viewfinder means to increase magnification of the viewfinder.

2. The single-lens reflex camera according to claim 1, wherein said auxiliary lens means has a positive refracting power and contracts an image on said objective lens means when inserted to be on the imaging side of said objective lens means.

3. The single-lens reflex camera according to claim 2, wherein said shifting means shifts said objective lens means toward the object side and shifts said auxiliary lens toward the image side.

4. The single-lens reflex camera according to claim 1, wherein said viewfinder means includes a re-imaging lens means for re-imaging an image formed by said objective lens means and auxiliary lens means and eyepiece lens means, said re-imaging lens and eyepiece lens means being disposed in the mentioned order in the direction of progress of light, and said shifting means moving said re-imaging lens.

5. The single-lens reflex camera according to claim 4, wherein said re-imaging lens includes at least two lenses, and said shifting means shifts said two lenses while varying the distance therebetween.

6. The single-lens reflex camera according to claim 2, wherein said viewfinder means includes re-imaging lens means for re-imaging an image formed by said objective lens means and said auxiliary lens means and eyepiece lens means, said re-imaging lens means and eyepiece lens means being disposed in the mentioned order in the direction of progress of light, and said means for increasing the viewfinder magnification shifts said eyepiece lens means along the viewfinder optical axis.

7. The single-lens reflex camera according to claim 6, wherein said eyepiece lens means includes at least two lenses, and said shifting means varies the distance between said two lenses.

8. A single-lens reflex camera capable of switching the optical path of the light beam from an objective lens between one leading to a photographing surface and one leading to a viewfinder, comprising:
    contracting lens means for contracting an image of said objective lens by being inserted into the image side of said objective lens when the light flux from the objective lens is introduced to the viewfinder from a photographing mode to expose onto the imaging plane: and
    means for shifting at least one of lenses constituting said viewfinder to increase a magnification of the viewfinder.

9. The single-lens reflex camera according to claim 8, wherein said contracting lens means has a positive refracting power.

10. The single-lens reflex camera according to claim 9, wherein said shifting means moves said objective lens means toward the object side and shifts said contracting lens means toward the image side.

11. The single-lens reflex camera according to claim 9 wherein said viewfinder means includes a re-imaging lens means for re-imaging an image formed by said objective lens means and contracting lens means, said re-imaging lens and eyepiece lens means being disposed in the mentioned order in the direction of progress of light, and said shifting means moving said re-imaging lens.

12. The single-lens reflex camera according to claim 11, wherein said re-imaging lens includes at least two lenses, and said shifting means shifts said two lenses while varying the distance therebetween 13. The single-lens reflex camera according to claim 9, wherein said viewfinder means includes re-imaging lens means for re-imaging an image formed by said objective lens means and said contracting lens means and eyepiece lens means, said re-imaging lens means and eyepiece lens means being disposed in the mentioned order in the direction of progress of light, and said shifting means shifts said eyepiece lens means along the viewfinder optical axis.

14. The single-lens reflex camera according to claim 13, wherein said eyepiece lens means includes at least two lenses, and said shifting means varies the distance between said two lenses

* * * * *

UNITED STATES PATENT AND TRADEMARK OFFICE
CERTIFICATE OF CORRECTION

PATENT NO. : 4,955,715          Page 1 of 4

DATED     : September 11, 1990

INVENTOR(S) : Kitigishi

It is certified that error appears in the above-identified patent and that said Letters Patent is hereby corrected as shown below:

TITLE PAGE
AT [54]:

Change "PSUEDO" to --PSEUDO--.

TITLE PAGE
AT [30]:

Change "63-267877" to --63-276877--.

COLUMN 1:

In the title, change "PSUEDO" TO --PSEUDO--.

Line 7, change "psuedo" to --pseudo--.

Line 13, change "psuedo" to --pseudo--.

Line 22, change "psuedo" to --pseudo--.

Line 28, change "psuedo" to --pseudo--.

Line 46, change "parallex" to --parallax--; and change "peculier" to --peculiar--.

Line 55, change "psuedo" to --pseudo--.

UNITED STATES PATENT AND TRADEMARK OFFICE
CERTIFICATE OF CORRECTION

PATENT NO. : 4,955,715

DATED : September 11, 1990

INVENTOR(S) : Kitigishi

It is certified that error appears in the above-identified patent and that said Letters Patent is hereby corrected as shown below:

COLUMN 2:

Line 3, change "psuedo" to --pseudo--.

Line 13, change "psuedo" to --pseudo--.

Line 16, change "psuedo" to --pseudo--.

Line 19, change "psuedo" to --pseudo--.

Line 27, change "veiwfinder" to --viewfinder--.

Line 39, change "eight" to --eighth--.

COLUMN 3:

Line 4, change "retreated" to --retracted--.

Line 9, change "expose" to --exposes--.

Line 20, change "M4," to --M4.--.

COLUMN 4:

Line 17, change "retreated" to --retracted--.

UNITED STATES PATENT AND TRADEMARK OFFICE
CERTIFICATE OF CORRECTION

PATENT NO. : 4,955,715

DATED : September 11, 1990

INVENTOR(S) : Kitigishi

Page 3 of 4

It is certified that error appears in the above-identified patent and that said Letters Patent is hereby corrected as shown below:

COLUMN 5:

Line 1, change "treated" to --tracted--.

Line 9, change "retreat" to --retraction--.

Line 14, change "reflex" to --reflect--.

COLUMN 6:

Line 25, change "varied" to --varies--.

Line 31, change "psuedo" to --pseudo--.

Line 39, change "FIG. 18" to --FIG. 17--.

Line 41, change "sixth" to --six--.

COLUMN 7:

Line 13, change "nineth" to --ninth--.

Line 14, change "FIG. 9" to --FIG. 20--.

Line 23, change "retreated" to --retracted--.

Line 45, change "have" to --have been--.

UNITED STATES PATENT AND TRADEMARK OFFICE
CERTIFICATE OF CORRECTION

PATENT NO. : 4,955,715            Page 4 of 4
DATED     : September 11, 1990
INVENTOR(S) : Kitigishi It is certified that error appears in the above-identified patent and that said Letters Patent is hereby corrected as shown below:

COLUMN 8:

Line 4, change "switching" to --shifting--.

Line 16, change "lens" to --lens means--.

Line 63, change "9" to --9,--.

Signed and Sealed this

Fourteenth Day of July, 1992

*Attest:*

DOUGLAS B. COMER

*Attesting Officer*     Acting Commissioner of Patents and Trademarks